OR 3,969,018

United Sta
Reinsch et al.

[11] 3,969,018
[45] July 13, 1976

[54] OBJECTIVE SYSTEM WITH ZOOM LENS FOR PHOTOGRAPHIC APPARATUS

[75] Inventors: Herbert Reinsch, Kongen; Peter Körner, Reichenbach, both of Germany

[73] Assignee: Robert Bosch G.m.b.H., Stuttgart, Germany

[22] Filed: Sept. 12, 1974

[21] Appl. No.: 505,601

[30] Foreign Application Priority Data

Sept. 17, 1973 Germany............................ 2346758

[52] U.S. Cl. ............................................. 350/187
[51] Int. Cl.² ....................................... G02B 15/00
[58] Field of Search ................................... 350/187

[56] References Cited
UNITED STATES PATENTS

| | | | |
|---|---|---|---|
| 3,613,544 | 10/1971 | Plihal et al....................... | 350/187 X |
| 3,817,600 | 6/1974 | Watanabe et al............... | 350/187 X |
| 3,851,952 | 12/1974 | Werz et al. ........................ | 350/187 |

*Primary Examiner*—John K. Corbin
*Assistant Examiner*—Conrad Clark
*Attorney, Agent, or Firm*—Michael J. Striker

[57] ABSTRACT

An objective system for motion picture cameras wherein a zoom lens is installed in a barrel and the barrel is surrounded by two ring-shaped selectors. The rear selector is rotatable to change the focal length of the lens by moving the optical elements of the rear group of optical elements of the lens with and relative to each other in the direction of the optical axis. The front selector is rotatable within a first angle to focus the image of a subject which is located at a distance of 5 ft. or more from the barrel, and within a second angle to focus the image of a subject prior to the making of close-up shots. The front selector moves the optical elements of the front group of optical elements of the lens during rotation within the first angle and the optical elements of the second group during rotation within the second angle. The focussing for close-up shots can be made after the focal length of the lens is reduced to a minimum value.

11 Claims, 2 Drawing Figures

OBJECTIVE SYSTEM WITH ZOOM LENS FOR PHOTOGRAPHIC APPARATUS

BACKGROUND OF THE INVENTION

The present invention relates to objectives or objective systems for photograhic apparatus, and more particularly to improvements in objectives which comprise variable-focus or zoom lenses. Still more particularly, the invention relates to objectives having variable-focus lenses and means for focussing during the making of exposures at close range or at a greater distance (including infinity) from the subject. As used in the specification and claims, the expression "objective" or "objective system" is intended to denote a picture taking lens (preferably a zoom lens), a tubular barrel or mount for the lens, and means for moving selected optical elements of the lens with respect to the barrel in the direction of the optical axis.

In certain presently known objectives with variable-focus lenses, the focussing of the image of a subject which is close to the lens is effected by actuating a first selector and the focussing of the image of a subject which is located at a larger distance from the lens (e.g., at a distance exceeding 1.5 meters) is effected by actuating a second selector. In an objective having a pancratic lens, the first selector (for focussing prior to the making of close-up shots) can also serve as a means for changing the focal length of the lens. The provision of two discrete selectors (one of which enables the user to focus at close range and the other of which allows for focussing at a greater distance from the subject) is likely to confuse an inexperienced photographer. Thus, the photographer must be on the alert to distinguish between focussing for close-up shots and focussing for normal shots. The likelihood of confusion is increased due to that fact that one of the selectors performs a dual function, namely focussing at close range and changing the focal length of the lens. Thus, a novice or an unskilled amateur will make many unsatisfactory exposures or will miss many unique shots because the first selector is mistakenly actuated to focus at a normal distance from the subject, the second selector is actuated by mistake to change the focal length, or the first selector is actuated in a wrong direction for the purpose of focussing at close range.

SUMMARY OF THE INVENTION

An object of the invention is to provide a novel and improved objective with variable-focus lens wherein a single selector serves for focussing the image of a subject at close range or at a greater distance from the camera.

Another object of the invention is to provide an objective which comprises a zoom lens and wherein the manipulation of means for changing the focal length and for focussing at any desired distance from the subject is simpler and less confusing to the user than in heretofore known objectives.

A further object of the invention is to provide novel and improved means for shifting the optical elements of a zoom lens in the objective of a motion picture camera.

An additional object of the invention is to provide a novel and improved operative connection between the focussing means and the means for changing the focal length of a zoom lens.

The invention is embodied in an objective system for photographic apparatus, especially motion picture cameras, which comprises a tubular mount or barrel, a picture taking lens (preferably a variable-focus lens) having a plurality of optical elements disposed in and movable axially of the barrel to thereby focus the image of a subject, selector means (e.g., a ring-shaped member which is rotatable on the barrel), and means for connecting the selector means with the plurality of optical elements so as to move selected optical elements axially in response to movement of the selector means with respect to the barrel. The selector means is movable between a first plurality of positions to thereby move at least one first optical element (e.g., the front group of optical elements of the lens) during focussing of the image of a subject which is located within a range of greater first distances from the barrel (e.g., within a range of distances from about 5 ft. to infinity), and the selector means is movable beyond the first plurality of positions to any one of a second plurality of positions to thereby move at least one second optical element (e.g., a rear group of optical elements of the lens) during focussing of the image of a subject which is located within a range of shorter second distances (e.g., not exceeding 5 ft.) from the barrel. Such shorter second distances correspond to the making of close-up shots.

The connecting means preferably comprises a cam which serves to effect axial movements of the second optical element while the selector means moves between the second plurality of positions.

The objective system preferably further comprises second selector means (e.g., a ring-shaped member which surrounds and is rotatable on the barrel behind the first selector means) and means for connecting the second selector means with selected optical elements of the lens (preferably with the aforementioned rear group of optical elements). The second selector means is movable with respect to the barrel to thereby move at least one optical element of the lens (e.g., the aforementioned second optical element) axially of the barrel and to thus change the focal length of the lens. The arrangement is preferably such that the first mentioned selector means can focus the image of a subject for the making of a close-up shot when the focal length of the lens is reduced to a minimum value.

The novel features which are considered as characteristic of the invention are set forth in particular in the appended claims. The improved objective system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
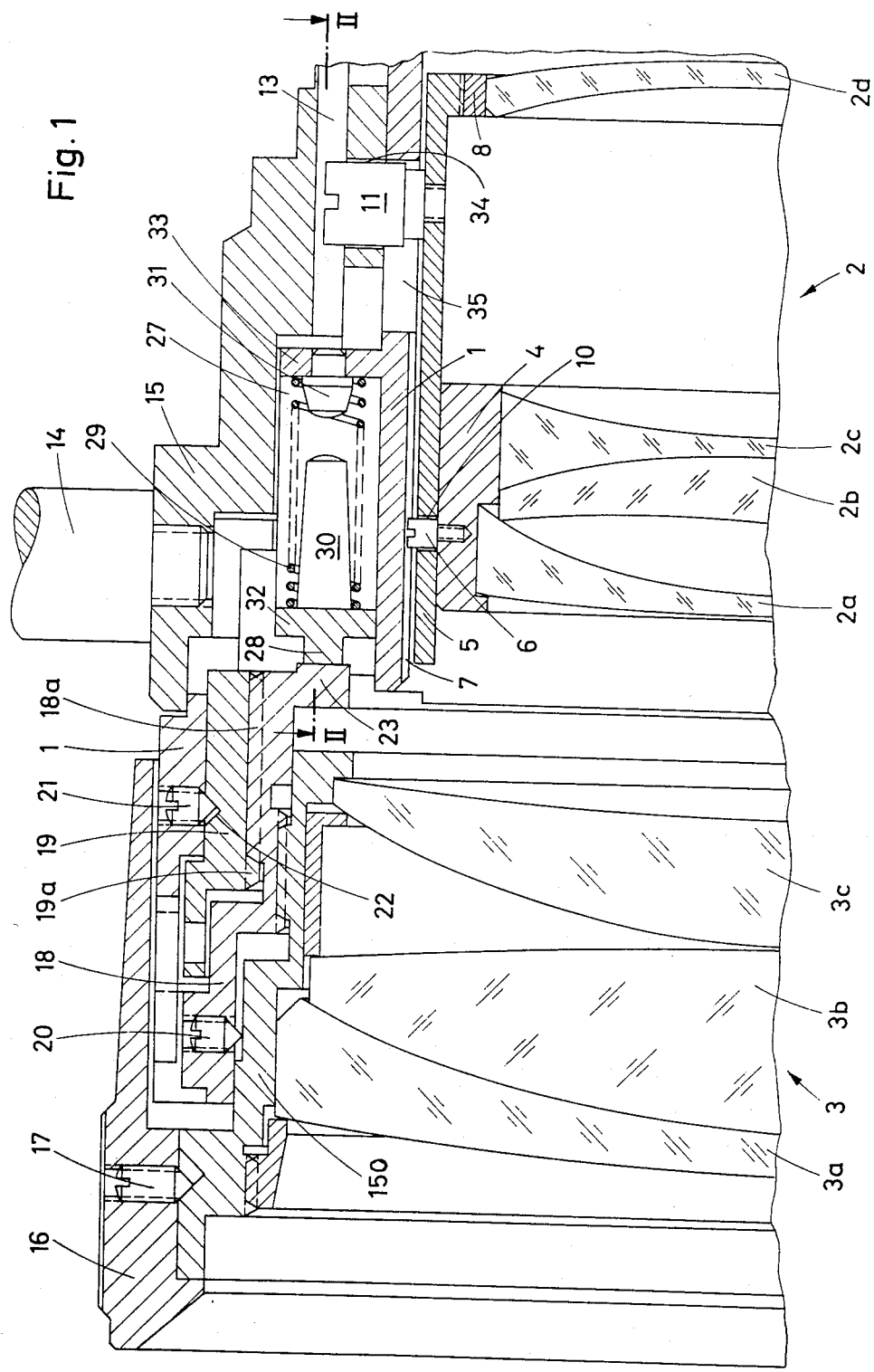
FIG. 1 is a fragmentary axial sectional view of an objective system with zoom lens which embodies the invention.

The drawing shows an objective which comprises a tubular barrel or mount 1 assumed to be rigidly secured to the housing or body of a photographic apparatus, not shown. The barrel 1 contains a variable-focus picture taking lens or zoom lens having two groups 2 and 3 of optical elements. The rear group or variator system 2 is movable axially in the barrel 1 in order to adjust the focal length of the lens as well as for focussing prior to the making of close-up shots. The front group 3 is movable axially in the barrel 1 for the purpose of focussing in the normal range of distances from the subject. The group 2 comprises four optical elements 2a, 2b, 2c, 2d and the group 3 comprises three optical elements 3a, 3b, 3c.

The elements 2a–2c of the rear group 2 are fixedly mounted in a ring 4 which is axially movable in a sleeve 5. The latter is rotatable in the barrel 1 to thereby effect a movement of the ring 4 and optical elements 2a–2c in the direction of the optical axis of the picture taking lens. The ring 4 receives motion from a follower here shown as a screw 6 whose head extends through a cam slot 10 in the sleeve 5 and into a longitudinally extending guide groove 7 in the internal surface of the barrel 1. The rearmost optical element 2d of the group 2 is mounted in a discrete ring 8 which is fixedly mounted in the sleeve 5. A second follower 11 is threadedly connected with and extends radially outwardly from the sleeve 5 in the region between the rings 4 and 8; this follower extends through and outwardly beyond a cam slot 12 (FIG. 2) of the barrel 1 so that its outermost portion extends into a longitudinally extending internal guide groove 13 of an annular focal length selector 15. The latter is rotatable on the barrel 1 and has a radially outwardly extending handle 14. When the user of the photographic apparatus rotates the selector 15 through the medium of the handle 14, the cam slots 10 and 12 cause the rings 4, 8 and the optical elements 2a–2d of the group 2 to move in the direction of the optical axis of the lens in accordance with a predetermined pattern which is calculated to establish desirable optical characteristics of the lens. The optical element 2d rotates with the sleeve 5 but the optical elements 2a–2c merely move in the axial direction of the barrel 1 because the outer end portion of the follower 6 extends into the groove 7. The shortest focal length is selected when the followers 6, 11 assume the illustrated positions, i.e., when the ring 4 is located at a maximum distance from the ring 8.

The optical elements 3a–3c of the front group 3 are installed in a ring 150 which is movable axially of the barrel 1 in response to manual rotation of a second annular selector 16. The latter surrounds and extends forwardly of the barrel 1 and is separably but rigidly affixed to the ring 150 by one or more screws 17 or analogous fasteners. FIG. 1 further shows two intermediate rings 18 and 19 which are installed between the ring 150 and the selector 16. The inner intermediate ring 18 is threadedly connected to the ring 150 and is non-rotatably secured thereto in a selected axial position by a screw 20. The outer intermediate ring 19 is axially adjustably connected with the barrel 1 by a screw 21. The rings 18 and 19 are respectively provided with mating external and internal threads 18a, 19a. When the ring 19 is being adjusted axially of the barrel 1, it transmits motion to the rings 18, 150 and to the selector 16. Such adjustment is effected by rotating the screw 21 which is received in a tapped radial bore of the barrel 1 and has a conical inner end portion extending into a conical socket or recess 22 in the periphery of the ring 19. If the screw 21 is rotated to move toward the optical axis of the lens the rings 18, 19, 150 and the selector 16 will move rearwardly. The screw 21 further serves as a means for non-rotatably connecting the ring 19 to the barrel 1.

The rear end portion of the inner intermediate ring 18 has an inwardly extending annular portion 23 which includes two cams 24 and 25 (see FIG. 2) facing the ring 4 for the optical elements 2a–2c. The cam 24 or 25 is engaged by a motion transmitting slide 27 which is movable in parallelism with the optical axis in ways 26 provided therefor in the barrel 1. The front end portion 28 of the slide 27 has a semicylindrical shape and abuts against the cam 24 or 25 under the bias of a helical spring 29. The latter surrounds a stud 30 of the slide 27 and a stud 31 in the barrel 1. The foremost convolution of the spring 29 bears against a crosshead 32 which forms part of the slide 27 and is disposed between the end portion 28 and stud 30. The rearmost convolution of the spring 29 bears against a retainer 33 which is a bracket forming part of the barrel 1 and carrying the stud 31.

Figure 2:
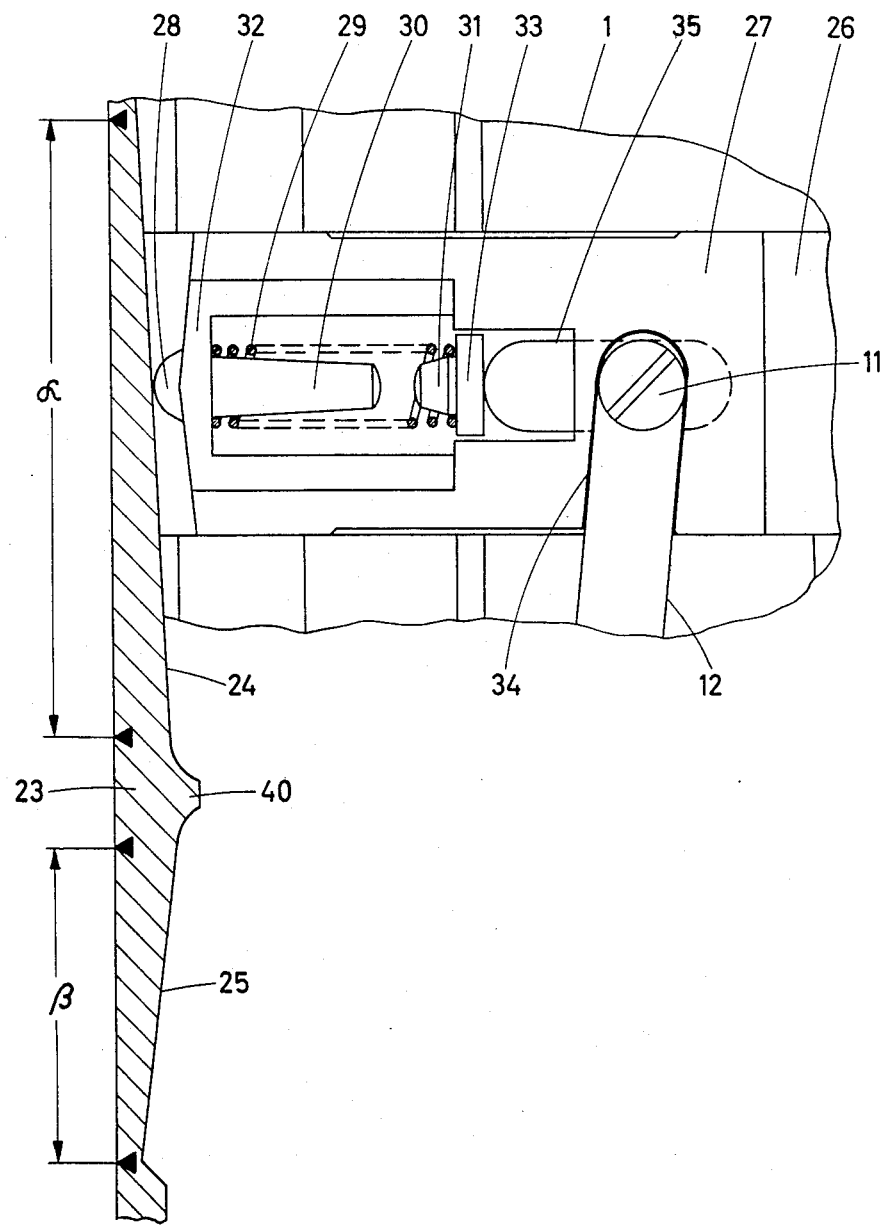
FIG. 2 is a fragmentary sectional view substantially as seen in the direction of arrows from the line II—II of FIG. 1.

FIG. 2 shows that the slide 27 has a cutout or slot 34 which extends substantially transversely of the ways 26 and can receive the head of the follower 11. The width of the slot 34 equals or approximates the width of the cam slot 12 in the barrel 1. In the illustrated axial position of the slide 27, the slot 34 is in exact register with the cam slot 12, i.e., the follower 11 can enter the slot 34 as soon as the sleeve 5 assumes that axial position which corresponds to the shortest focal length of the lens.

The barrel 1 is formed with an internal groove 35 which extends in parallelism with the optical axis and communicates with the cam slot 12. The groove 35 permits axial movements of the group 2 for the purpose of focussing prior to the making of a close-up shot when the focal length of the lens has been reduced to a minimum value. Thus, the follower 11 can move in the groove 35 when the sleeve 5 assumes the position shown in FIG. 1. The distance between the optical elements 2a–2c on the one hand and the optical element 2d on the other hand (i.e., between the rings 4 and 8) remains unchanged when the follower 11 extends into and moves in the groove 35 of the barrel 1. The sleeve 5 is then movable by the selector 16 while the latter causes the cam 25 of the annular portion 23 of the intermediate ring 18 to move with respect to the slide 27. The annular portion 23 can reach the front end portion 28 of the slide 27 subsequent to an angular displacement through the angle alpha (focussing prior to the making of shots at close range), i.e., the cam 25 can engage the slide 27 only after the ring 18 has been rotated beyond the plurality of angular positions (angle alpha) in which the slide 27 bears against the cam 24. The plurality of angular positions of the selector 16 in which the cam 25 engages the slide 27 is shown at beta. The inclination of the cam 25 is selected in such a way that the spring 29 is free to expand and to move the slide 27 forwardly when the cam 25 engages the end portion 28 and the ring 18 is rotated in a direction to move the cam 24 away from the slide 27. The slide 27 then causes the group 2 to move toward the group 3 because the surface bounding the slot 34 moves the follower 11 forwardly and the latter is free to slide in the longitudinally extending groove 35 of the barrel 1. The forward movement of the group 2 toward the group 3 is a composite movement including a first movement which is caused by the spring 29 (the latter urges the slide 27 forwardly while the end portion 28 engages the cam 25 and the cam 25 moves upwardly, as viewed in FIG. 2) and a second movement which is caused by the inner intermediate ring 18 (the latter moves forwardly because its threads 18a mesh with the threads 19a of the ring 19 which is fixed to the barrel 1). The ring 18 is rotated by the selector 16 through the medium of the ring 150, and the ring 19 causes the ring 18 to move forwardly when the cams 24, 25 move upwardly, as viewed in FIG. 2.

The inclination of the cam 24 is identical to the pitch of the threads 18a, 19a. Therefore, the axial position of the slide 27 remains unchanged when its end portion 28 tracks the cam 24 while the selector 16 rotates the ring 18 and its annular portion 23. This insures that the follower 11 can enter the slot 34 of the slide 27 when the sleeve 5 is moved to the axial position of FIG. 1 (shortest focal length of the lens).

During assembly of the objective, the rings 150, 18 and 19 are threadedly connected to each other and inserted into the barrel 1 in such a way that the end portion 28 of the slide 27 abuts against the cam 24 of the annular portion 23 at the rear end of the ring 18. Thus, the ring 18 can assume the angular position which is shown in FIG. 2. The screw 21 is thereupon rotated in a direction to introduce its conical inner end portion into the socket 22 and to adjust the axial position of the rings 18, 19, 150 in such a way that the slot 34 of the slide 27 is in exact register with the cam 12. As the screw 21 moves radially inwardly, its conical end portion slides along the right-hand side of the conical surface bounding the socket 22 so that the rings 18, 19, 150 move rearwardly against the opposition of the spring 29, i.e., the spring 29 permanently urges the surface surrounding the socket 22 against the screw 21. The exact axial position of the ring 150 and group 3 can be selected thereafter by loosening the screw 20, by rotating the ring 150 through the medium of the selector 16 (the ring 150 meshes with the ring 18), and by thereupon tightening the screw 20.

The operation:

If the user of the camera wishes to focus for the purpose of making normal exposures (i.e., other than close-up shots), the selector 16 is rotated to move the ring 18 within the angle alpha so that the slide 27 engages the cam 24. For example, such angular adjustment of the ring 18 enables the user to focus the image of a subject which is located at a distance between 1.5 meters and infinity. As a result of the just mentioned rotation of the selector 16, the ring 18 moves axially of the barrel 1 because it rotates with the selector 16 (it receives torque via screw 17, ring 150 and screw 20) and because its threads 18a mesh with the threads 19a of the ring 19 which is secured to the barrel 1 by the screw 21. The end portion 28 of the slide 27 bears against the cam 24 under the action of the spring 29 but the axial position of the sleeve 5 (and hence of the group 2) remains unchanged because the slope of the cam 24 is identical with the pitch of threads 18a, 19a.

If the user wishes to change the focal length of the picture taking lens, the selector 15 is rotated by moving the handle 14 about the barrel 1. The selector 15 rotates the sleeve 5 through the medium of the follower 11 (because the latter extends into the longitudinally extending groove 13 of the selector 15) whereby the follower 11 travels in the cam slot 12 and moves the sleeve 5 in the barrel 1 through a relatively short distance, as considered in the direction of the optical axis.

As the sleeve 5 turns with the selector 15, the follower 6 slides in the cam slot 10 and causes the ring 4 to move axially of the sleeve. The cam slot 10 causes the ring 4 and the optical elements 2a–2c to approach the ring 8 and optical element 2d while the focal length increases.

In order to focus prior to the making of close-up shots, the focal length of the lens must be reduced to the minimum value, i.e., the selector 15 must be rotated in a direction to increase the distance between the rings 4, 8 to the maximum value shown in FIGS. 1 and 2, whereby the slot 34 of the slide 27 registers with the cam slot 12. The follower 11 has entered the slot 34 and its outermost portion extends into the groove 35 of the barrel 1. Thus, the slide 27 can move the sleeve 5 lengthwise (through the medium of the follower 11 and the surface surrounding the slot 34) whereby the follower 11 slides in the groove 35. Ths slide 27 moves lengthwise in response to rotation of the selector 16 and ring 18 beyond that plurality of angular positions (angle alpha) in which the ring 18 focuses prior to the making of exposures at a distance from the subject which exceeds 1.5 meters. In order to enable the user to detect or sense the movement of the ring 18 beyond the angular positions for normal focussing (angle alpha), the cams 24, 25 of the annular portion 23 are separated from each other by a pronounced protuberance or lobe 40 (FIG. 2) which must be caused to bypass the slide 27 before the latter can engage the cam 25. Thus, the focussing is always effected by rotating the selector 16 whereby, in order to focus prior to the making of close-up shots, the user must rotate the selector 16 beyond that range of angular positions (angle alpha) which are provided for focussing at a distance between 1.5 meters and infinity in order to move the selector 16 to one of a second plurality of angular positions (angle beta) which are provided for focussing at a close range. When the selector 16 is rotated in a direction to move the lobe 40 beyond the end portion of the slide 27, the latter begins to move forwardly under the action of the spring 29 because the cam 25 slopes forwardly as considered in the circumferential direction of the annular portion 23 (and assuming that the selector 16 moves the ring 18 and annular portion 23 upwardly, as viewed in FIG. 2). The sleeve 5 shares the lengthwise movement of the slide 27 in the ways 26 but the distance between the rings 4 and 8 remains unchanged because the sleeve 5 does not rotate about the optical axis. Thus, the optical element 2d is separated from the optical elements 2a–2c by a (maximum) distance, which corresponds to the minimum focal length of the lens, whenever the slide 27 engages the cam 25.

An important advantage of the improved objective is that a single selector 16 can be manipulated to focus at any distance of the subject from the photographic apparatus. Thus, the user need not actuate different selectors for the same purpose (focussing); all the user has to know is that focussing at close range must be preceded by the selection of a predetermined focal length, and the focal length is changed by manipulating one and the same selector 15. As mentioned above, such simplification of the manipulation of a relatively complex objective is especially important when the photographic apparatus embodying the improved objective is used by a novice or an inexperienced amateur photographer. However, the simplification of manipulation of the objective is equally beneficial to professionals or skilled amateur photographers.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an objective system for photographic apparatus, a combination comprising a barrel; a variable-focus picture-taking lens having a plurality of optical elements disposed in and movable axially of said barrel to thereby focus the image of a subject; a focus selector element movably mounted on said barrel; first connecting means for connecting said selector element with said plurality of optical elements so as to move selected optical elements axially in response to movement of said selector element relative to said barrel, said selector element being displaceable between a first plurality of positions to thereby move at least one first optical element of said plurality of optical elements through the medium of said connecting means during normal focusing of the image of a subject which is located within a range of first distances from the barrel, and said selector element being displaceable beyond said first plurality of positions to any one of a second plurality of positions to thereby move at least one second optical element of said plurality of optical elements through the medium of said connecting means during close-up focussing of the image of a subject which is located within a range of shorter second distances from the barrel such as correspond to the making of close-up shots, said connecting means comprising a cam, a motion transmitting member engaging said cam and operatively connected with said second optical element in each of said plurality of second positions of said selector element, and means for biasing said motion transmitting member against said cam, said motion transmitting member including a slide which is reciprocable in said barrel in parallelism with the optical axis of said lens; selector means and second connecting means for connecting said selector means with said second optical element, said selector means being movable with respect to said barrel to thereby move said second optical element axially and to thus change the focal length of said lens, said second connecting means comprising a second cam in said barrel and a follower operatively connected with said first optical element, tracking said second cam and rotatable by said selector means, said barrel further having a longitudinally extending groove and said slide having a slot into which said follower extends in a predetermined axial position of said second optical element, said follower further extending into said groove in response to movement of said second optical element to said predetermined axial position whereby said slide can move said second optical element axially in response to movement of said selector element between said second plurality of positions, said first connecting means comprising a third cam which is engaged by said slide in each of said plurality of first positions of said selector element, the slope of said third cam being such that the axial position of said second optical element remains unchanged while said selector element moves between said plurality of first positions, said first connecting means further comprising a ring which surrounds said first optical element and is rotatably and axially movably mounted in said barrel, said first mentioned and third cams being provided on said ring, and said ring comprising a protuberance disposed between said first mentioned and third cams and over which said slide rides against the opposition of said biasing means during movement of said selector element beyond said plurality of first positions; and means for confining said selector element to a single type of movement with respect to said barrel both during its displacement between said first plurality of positions and during its displacement between said second plurality of positions.

2. A combination as defined in claim 1, wherein said connecting means further comprises means for connecting said ring to said selector element so that said ring moves axially of said barrel at least while said selector element moves between said first plurality of positions, said first optical element being mounted in and being movable with said ring and said additional cam being rigid with said ring.

3. A combination as defined in claim 2, further comprising means for adjusting the axial position of said ring with respect to said barrel.

4. A combination as defined in claim 2, wherein said ring has a first set of threads and further comprising a second set of threads supported by said barrel and meshing with said first set of threads, said selector element being rotatable with said ring relative to said barrel to thereby rotate said ring and said first optical element while moving between said first plurality of positions whereby said threads move said ring and said first optical element axially.

5. A combination as defined in claim 4, wherein said confining means comprises a second ring normally rigid with said barrel, said first set of threads constituting external threads on said first mentioned ring and said second set of threads constituting internal threads of said second ring.

6. A combination as defined in claim 1, further comprising selector means, and means for connecting said selector means with selected optical elements of said lens, said selector means being movable with respect to said barrel to thereby move at least one of said optical elements axially of said barrel through the medium of said last mentioned connecting means and to thus change the focal length of said lens.

7. A combination as defined in claim 6, wherein said one optical element is said second optical element and said last mentioned connecting means comprises a device for moving said one optical element to a predetermined axial position corresponding to a predetermined focal length of said lens, said one optical element being movable axially by said first mentioned connecting means from said predetermined axial position in response to movement of said selector element between said second plurality of positions.

8. A combination as defined in claim 7, wherein said last mentioned connecting means further comprises a sleeve surrounding said one optical element and being rotatable and axially movable in said barrel, a cam on said barrel, and a follower constituting said device, said follower being connected with said sleeve and tracking said cam in response to rotation of said sleeve by said selector means.

9. A combination as defined in claim 8, wherein said barrel has a longitudinally extending groove into which said follower extends in said predetermined axial position of said one optical element, said motion transmitting member moving said follower in said groove in response to movement of said selector element between said plurality of second positions.

10. A combination as defined in claim 9, wherein the focal length of said lens is reduced to a minimum value in said predetermined axial position of said one optical element.

11. In an objective system for photographic apparatus, a combination comprising a barrel; a variable-focus picture-taking lens having a plurality of optical elements disposed in and movable axially of said barrel to thereby focus the image of a subject; a focus selector element movably mounted on said barrel; connecting means for connecting said selector element with said plurality of optical elements so as to move selected optical elements axially in response to movement of said selector element relative to said barrel, said selector element being displaceable between a first plurality of positions to thereby move at least one first optical element of said plurality of optical elements through the medium of said connecting means during normal focusing of the image of a subject which is located within a range of first distances from the barrel, and said selector element being displaceable beyond said first plurality of positions to any one of a second plurality of positions to thereby move at least one second optical element of said plurality of optical elements through the medium of said connecting means during close-up focussing of the image of a subject which is located within a range of shorter second distances from the barrel such as correspond to the making of close-up shots, said connecting means comprising a cam, a motion transmitting member engaging said cam and operatively connected with said second optical element in each of said plurality of second positions of said selector element, said motion transmitting member including a slide which is reciprocable in said barrel in parallelism with the optical axis of said lens means for biasing said motion-transmitting member against said cam, an additional cam which is engaged by said slide in each of said plurality of first positions of said selector element and having a slope which is such that the axial position of said second optical element remains unchanged while said selector element moves between said plurality of first positions, a ring which surrounds said first optical element and is rotatably and axially movably mounted in said barrel, said cams being provided on said ring, and said ring comprising a protuberance disposed between said first cams and over which said slide rides against the opposition of said biasing means during movement of said selector element beyond said plurality of first positions; and means for confining said selector element to a single type of movement with respect to said barrel both during its displacement between said first plurality of positions and during its displacement between said second plurality of positions.

* * * * *